Dec. 7, 1943.  W. A. HYLAND  2,336,099

CLUTCH MECHANISM

Filed May 22, 1941

INVENTOR
William A. Hyland
ATTORNEYS

Patented Dec. 7, 1943

2,336,099

UNITED STATES PATENT OFFICE 2,336,099

CLUTCH MECHANISM

William A. Hyland, Horicon, Wis., assignor to The Van Brunt Manufacturing Company, Horicon, Wis., a corporation of Wisconsin Application May 22, 1941, Serial No. 394,567

15 Claims. (Cl. 111—34)

The present invention relates generally to agricultural implements and more particularly to new and improved clutch mechanism therefor.

The object and general nature of the present invention is the provision of new and improved clutch mechanism for an agricultural implement by which successive actuations of a trip rope or other part cause the alternate engagement and disengagement of a clutch controlling the drive between implement parts. More specifically, it is a feature of this invention to provide clutch throw-out construction in which, with fewer parts than heretofore, the engagement and disengagement of the clutch may be effected by successive actuations of a controlling member.

An additional feature of this invention is the provision of clutch mechanism incorporating axial driving and driven parts with a pair of cooperating cam elements disposed axially therebetween and so constructed and arranged that successive actuations of one cam element in one direction causes the alternate engagement and disengagement of the clutch parts. More specifically, it is a feature of the present invention in this connection to provide ratchet means cooperating with one cam element for preventing the latter from rotating in one direction and spring means associated with the other cam element for rocking both of them in the other direction, whereby, with only two parts and a cooperating pawl, successive actuations of one of the cam elements in one direction cause the alternate engagement and disengagement of the clutch. Still further, another feature of the present invention is the provision of clutch controlling mechanism of this kind incorporated in a grain drill or the like for controlling the drive to the feed shaft.

These and other objects and advantages of the present invention will be apparent to those skilled in the art after a consideration of the following detailed description of the preferred structure in which the principles of the present invention have been incorporated.

Figure 1:
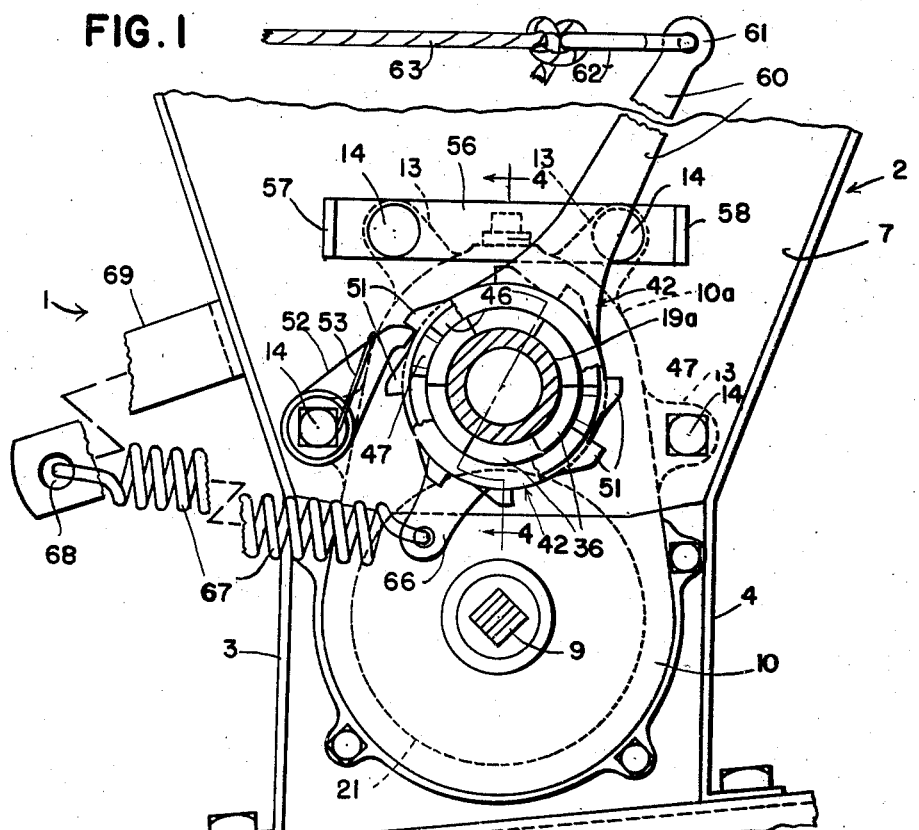
Figure 1 is an end view of a grain drill in which the clutch controlling mechanism of the present invention has been incorporated.

Referring now to the drawing, more particularly to Figure 1, the reference numeral 1 indicates an agricultural implement, preferably a grain drill having a grain box 2 that is supported by suitable members 3 and 4 on a frame 5. The grain box 2 is provided with ends 7. The grain drill 1 includes suitable seed feeding mechanism, preferably driven by a feed shaft 9, one end of which extends into the lower portion of a gear casing 10, the upper portion 10a of which is disposed within the grain box 2 and adjacent the box end 7 thereof. The upper portion 10a of the gear case 10 is provided with pairs of apertured ears 13 in which bolts 14 are disposed and which fix the gear case 10 to the grain box 2.

Figure 4:
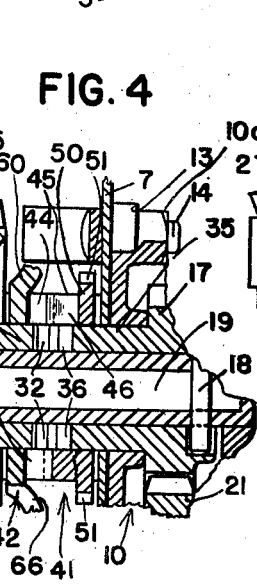
Figure 4 is a fragmentary sectional view taken generally along the line 4—4 of Figure 1.

A pair of gears, one of which is shown in Figure 4 at 17, is disposed within the gear case. The gear 17 is connected, as by a pin 18 (Figure 4), to a shaft 19, one end of which extends into the upper end 10a of the gear case and the other end of which extends laterally outwardly, as indicated at 19a. The shaft 19 drives the gear 17, and the latter drives the other gear within the case 10, said other gear being connected with the feed shaft 9. The other gear is indicated by the reference numeral 21.

A driving sprocket gear 25 is disposed about the outer end 19a of the shaft 19 and is provided exteriorly with a hub 26 which receives the inner end of a spring 27, the latter also being disposed about the outer end 19a of the shaft 19. The outer end of the spring 27 bears against a washer 28 that is held in place on the shaft 19a by a cotter 29. A driving chain (not shown) is trained about the driving gear member 25 and a companion sprocket gear fixed to or connected with one of the supporting wheels of the drill. The inner end of the gear member 25 is provided with a clutch section 31 having driving clutch teeth 32 facing in a generally axial direction, the gear member 25 being mounted for rotation on the shaft 19, as best shown in Figure 4. The gear 17, within the upper portion 10a of the gear case 10, is provided with an elongated hub section 35 which constitutes a driven clutch section and is provided with a set of clutch teeth 36 adapted to be engaged by the driving clutch teeth 32, whereby the drive may be transmitted from the driving gear member 25 to the gear 17 within the casing 10. The spring 27 normally urges the clutch sections 31 and 35 into engagement.

The mechanism for controlling the engagement and disengagement of the clutch sections 31 and 35, with which the present invention is more particularly concerned, will now be described.

Figure 2:
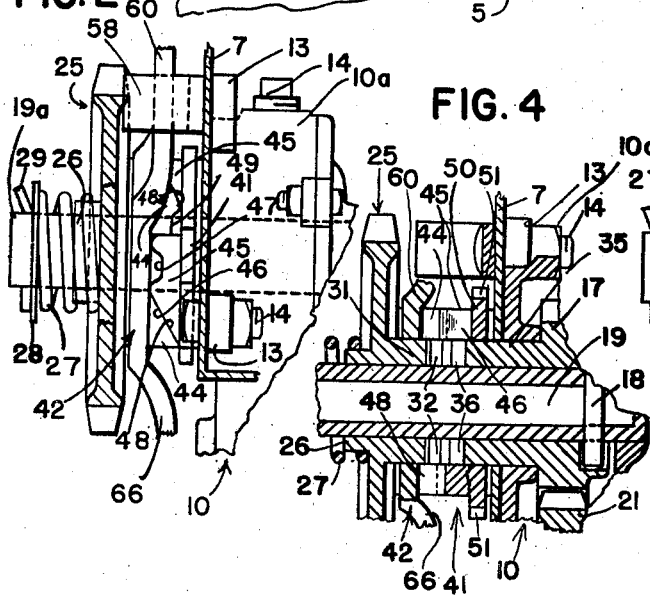
Figures 2 and 3 are fragmentary elevational views, looking forwardly, showing the clutch controlling means in its two positions.
Figure 3:
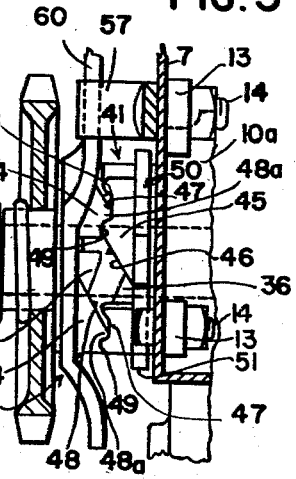

A pair of cooperating cam elements 41 and 42 are disposed about the clutch sections 31 and 35 and are mounted for rotation thereon in a position between the gear members 17 and 25. The cam element 41 is provided with a plurality of, preferably four, cam lugs 45, each having an axially facing inclined cam section 46 and a recessed face 47 (Figures 2 and 3). The other cam element 42 is provided with similar cam lugs 44 having axially facing cam surfaces and recesses 48 and 49, such cam surfaces and recesses facing generally in opposite directions, as best shown in Figure 3. The cam element 41 is also provided with a radial flange section 50 which is provided with a plurality of ratchet teeth 51 with which a pawl 52 (Figure 1) is adapted to cooperate. Preferably, the pawl 52 is mounted for rocking movement on one of the bolts 14 and is urged for movement toward the ratchet teeth 51 by a spring 53. It will be seen from Figure 1 that the pawl 52 prevents the rotation of the cam element 41 in a counterclockwise direction, as viewed in Figure 1, but permits clockwise rotation thereof. The other cam element 42 is rockable on the clutch section 31 in either direction, but its movement is limited by a strap member 56 (Figure 1) the ends 57 and 58 of which are bent laterally to form stops for cooperation with an actuating arm 60 which is formed as an integral part of the cam element 42 but which may be separately formed and secured thereto, if desired. The outer end of the arm 60 is formed with an eye 61 to receive a link 62 to which the rear end of an actuating cable 63 is connected. Also formed integral with the cam element 42 is a lug 66 (Figure 1) which is apertured to receive the rear end of a spring 67, the forward end of which is disposed in an aperture 68 formed in a bracket 69 bolted to the front box supporting strap 3. The cam element 41 is disposed up against the box end 7.

The operation of the clutch controlling mechanism of the present invention is substantially as follows:

When the parts are arranged as shown in Figure 2, the clutch teeth 32 and 36 are in engagement and the drive is transmitted from the driving gear 25 through the clutch sections 31 and 35 to the gear 17, and thence through the gear 21 to the feed shaft 9. The rotation of the gear 17 also causes the shaft 19 to rotate for the purpose of driving agitators or some other operating part in the grain box 2. If it is desired to disengage the clutch, the operator pulls on the cable 63, rocking the arm 60 from the position shown in Figure 1 forwardly until it engages the stop lug 57, thus rotating the cam element 42 through a part of a revolution in a counterclockwise direction, as viewed in Figure 1. However, the companion cam element 41 is restrained against rotation in this direction by the pawl 52, and therefore the cam surfaces 48 (Figure 2) ride upon the cam surfaces 46 so as to cause the cam element 42 to be shifted axially outwardly of the shaft 19 into the position shown in Figure 3. The parts are so arranged that when the arm 60 is moved from its rear position into its forward position, the tip 48a rides off of the outer part of the cooperating cam surface 46 and into the recess 47, thus holding the cam elements 41 and 42 in the relative position shown in Figure 3. This axially outward movement of the cam member 42 moves the driving gear 25 also axially outwardly, since the cam member 42 engages the gear 25, and this axially outward movement of the latter causes the clutch teeth 32 and 36 to separate and compresses the spring 27. After the clutch is thus disengaged, the operator releases his hold on the cable 63, whereupon the spring 67 will then rock the cam member 42 and the arm 60 in a clockwise direction (Figure 1) back into the position shown in Figure 1. Due, however, to the fact that the tips 48a are disposed in the cooperating cam recesses 47, this clockwise movement (Figure 1) of the cam member 42 also carries with it the cooperating cam member 41, such clockwise rotation of the latter being permitted by the pawl 52, as will be clear from Figure 1. Therefore, during this restoring movement by the spring 67, there is no relative movement of the cam elements 41 and 42, and hence the clutch remains in disengaged position.

When the farmer desires to reengage the clutch, he pulls a second time on the cable 63, again rocking the arm 60 and the cam element 42 in a counterclockwise direction (Figure 1). Since the cooperating cam element 41 cannot be rocked in this direction, due to the action of the pawl 52, this movement of the cam element 42 causes the tips 48a to ride out of the cam recesses 47 and into a position in which the inclined cam surfaces 46 and 48 are again in contact and permitting the spring 27 to force the gear 25 to the right (Figures 2-4), which movement reengages the clutch teeth 32 with the clutch teeth 36 and thereby reestablishes a driving connection between the driving gear 25 and the associated parts. After the clutch is thus reengaged, the operator again releases his hold on the cable 63, and the spring 67 restores the cam element 42 and arm 60 to the position shown in Figure 1, the two cam elements 41 and 42 moving together, the corresponding movement of the cam element 41 being permitted by the pawl 52.

Thus, with the provision of only two relatively movable parts and a pawl, I have provided clutch controlling mechanism by which successive actuations of an actuating member in one direction alternately engages and disengages the clutch. Mechanism of this kind is admirably adapted to use with trailing agricultural implements in which the clutch or clutches thereof may thus be controlled by a simple cable running from the implement forward to the tractor or other source of power for propelling the same.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. Mechanism for engaging and disengaging a pair of driving and driven clutch members biased to move into engaged position, comprising a pair of cooperating cam elements disposed between portions of said clutch members and adapted in one relative position to separate said clutch members and in the other position to permit their engagement, means for retaining said cam elements in either of their two relative positions, and means for successively advancing one cam element relative to the other so as to alternately engage and disengage said clutch members.

2. Mechanism for engaging and disengaging a pair of driving and driven clutch members biased to move into engaged position, comprising a pair of cam elements disposed concentrically between and engaging positions of said clutch members, said cam elements having cooperating cam surfaces whereby in one relative position said cam elements hold said clutch elements disengaged and in another relative position said cam elements permit said clutch members to engage, ratchet means preventing movement of one cam element in one direction but permitting its movement in the other direction, and means for oscillating the other cam element, movement of said other cam element relative to said one cam element in said one direction alternately engaging and disengaging said clutch members.

3. Mechanism for engaging and disengaging driving and driven clutch members biased to move into engaged position, comprising a pair of cam elements disposed about and generally radially outwardly of said clutch members, each of the latter including a generally radially outwardly extending portion, one of said cam elements engaging the radially outwardly extending portion of one of said clutch members and the other cam element engaging the radially outwardly extending portion of the other clutch member, said cam elements having cooperating cam surfaces whereby in one relative position said elements separate said members and in the other position said members move into engagement, and means for successively advancing one of said elements relative to the other for alternately engaging and disengaging said clutch members.

4. Mechanism for engaging and disengaging a pair of driving and driven clutch members having radial portions and biased to move into engaged position, each of said clutch members having toothed sections adapted to engage one another, said mechanism comprising a pair of parts adapted to rotate concentrically outwardly of said toothed sections and disposed between said radial portions of said clutch members, means for successively advancing one part relative to the other part, and means whereby the successive advance of said one part relative to the other alternately engages and disengages said clutch member.

5. Mechanism for engaging and disengaging a pair of coaxial clutch members mounted for rotation relative to a relatively stationary part, comprising means mounted for rotation about the axis of said clutch members, ratchet means including a pawl carried by said stationary part and engageable with said rotatable means for preventing rotation thereof in one direction but permitting its rotation in the other direction, means mounted for rocking movement about said axis for successively advancing said rotatable means in said other direction, and means whereby movement of said rotatable means into successive positions alternately engage and disengage said clutch members.

6. Mechanism for engaging and disengaging a pair of driving and driven clutch members mounted coaxially and biased for movement toward engaged position, comprising a pair of cam elements mounted for rotation on said clutch members, respectively, and having cooperating cam surfaces whereby, in one relative position, said cam elements serve to hold said clutch members in disengaged position and in another relative position said cam elements permit said clutch members to be moved into engaged position under the influence of said bias, a stationary part with respect to which said clutch members and said cam elements are mounted for movement, ratchet teeth formed on one of said cam elements, a pawl carried by said stationary part and engageable with said ratchet teeth to prevent movement of said one cam element in one direction and permitting movement thereof in the other direction, means for advancing the other cam element in said one direction so as to move one cam element relative to the other for engaging and disengaging the clutch members, and spring means for retracting said other cam element in the other direction, said one cam element moving with said other cam element during such retracting movement whereby during the latter the relative position of said clutch members is unaffected.

7. Mechanism for engaging and disengaging a pair of axially arranged driving and driven clutch members, comprising a pair of cam elements mounted for rotation about the axis of said clutch members, cooperating cam surfaces on said cam elements whereby movement of one relative to the other controls the engagement and disengagement of said clutch members, means for moving said cam elements together in one direction about said axis, and means for moving one cam element relative to the other in the other direction for controlling said clutch members.

8. In an agricultural implement, a shaft, a pair of driving and driven members mounted on said shaft, one of said members being fixed to rotate therewith and the other being mounted rotatably and slidably on said shaft, engageable and disengageable toothed clutch sections connected, respectively, with said driving and driven members, a pair of relatively movable cam elements mounted for rocking movement about said toothed clutch sections and adapted in one relative position to separate the latter, means for oscillating one of said cam elements, and one-way mechanism associated with the other cam element providing for movement thereof with said one cam element in one direction and preventing movement thereof when said one cam element is rocked in the other direction, whereby successive movements in the same direction of said one cam element alternately engages and disengages said driving and driven members.

9. In an agricultural implement, a shaft, a pair of driving and driven members mounted on said shaft, one of said members being fixed to rotate therewith and the other being mounted rotatably and slidably on said shaft, engageable and disengageable toothed clutch sections connected, respectively, with said driving and driven members, a pair of relatively movable cam elements mounted for rocking movement about said toothed clutch sections and adapted in one relative position to separate the latter, one of said cam elements acting in a generally axial direction against one of said driving and driven members and the other reacting generally axially against the other of said members when one cam element is rocked with respect to the other for disengaging said clutch sections, and means for rocking said latter cam element for controlling the engagement and disengagement of said clutch sections.

10. In an agricultural implement, a shaft, means including a driven clutch member connected to rotate with said shaft, said driven clutch member including a toothed clutch section, a driving clutch member mounted rotatably on said shaft and including a driving gear and a driving clutch section adapted to engage said driven clutch section for transmitting the drive from said gear to said shaft, spring means disposed about said shaft and reacting against the latter and said driving gear for urging the driving clutch section into engagement with the driven clutch section, and a pair of relatively rotatable cam elements mounted about said clutch sections and reacting, respectively, against said driving and driven members, said cam elements being adapted in one relative position to hold said driving gear member and said driving clutch section in disengaged position.

11. In an agricultural implement, a shaft, means including a driven clutch member connected to rotate with said shaft, said driven clutch member including a toothed clutch section, a driving clutch member mounted rotatably on said shaft and including a driving gear and a driving clutch section adapted to engage said driven clutch section for transmitting the drive from said gear to said shaft, spring means disposed about said shaft and reacting against the latter and said driving gear for urging the driving clutch section into engagement with the driven clutch section, and a pair of cam elements disposed about said clutch sections, one of said cam elements being movable relative to the other cam element, said one cam element being engageable with said driving gear for moving the latter in a direction to disengage the driving clutch section from said driven clutch section.

12. In an agricultural implement, a shaft, means including a driven clutch member connected to rotate with said shaft, said driven clutch member including a toothed clutch section, a driving clutch member mounted rotatably on said shaft and including a driving gear and a driving clutch section adapted to engage said driven clutch section for transmitting the drive from said gear to said shaft, spring means disposed about said shaft and reacting against the latter and said driving gear for urging the driving clutch section into engagement with the driven clutch section, a pair of cam elements, both mounted for rotation on said clutch sections and disposed for relative axial movement in a position between said driving gear and said driven member, one of said cam elements being engageable with said driving gear and adapted to be rocked in opposite directions about the axis of said shaft, means serving to prevent rotation of the other cam element in one direction but accommodating rotation thereof in the other direction, actuating means connected with said one cam element for moving the cam in said one direction, the resulting relative movement between said cam elements serving to cause said one cam element to engage said gear and disengage said clutch sections, and spring means for moving both of said cam elements together in the other direction, whereby successive operations of said actuating means in said one direction alternately causes the engagement and disengagement of said clutch sections.

13. In a grain drill or the like, having a grain box, a gear case inside one end of said box, and shaft means extending from said gear case laterally outwardly through the end of said grain box, driving mechanism for said shaft means comprising a driving member rotatably and slidably mounted on said shaft means outwardly of said grain box end, a driven member mounted on said shaft means within said gear case having a toothed clutch section disposed outside said grain box end, a toothed clutch section on said driving member, spring means on the outer end of said shaft means for moving said driving member to cause said clutch sections to engage, and means acting between the grain box end and said driving member for controlling the engagement and disengagement of said clutch sections.

14. In a grain drill or the like, having a grain box, a gear case inside one end of said box, and shaft means extending from said gear case laterally outwardly through the end of said grain box, driving mechanism for said shaft means comprising a driving member rotatably and slidably mounted on said shaft means outwardly of said grain box end, a driven member mounted on said shaft means within said gear case and having a toothed clutch section disposed outside said grain box end, a toothed clutch section on said driving member, spring means on the outer end of said shaft means for moving said driving member to cause said clutch sections to engage, a pair of cam elements mounted for movement about said clutch sections, pawl means carried by said grain box end and engageable with one of said cam elements for preventing rotation of the latter in one direction but accommodating rotation thereof in the other direction, actuating means connected with the other cam element for moving the latter in said one direction, the resulting relative movement between said cam elements reacting against said driving member for separating said clutch sections, and restoring means connected with said other cam element for moving both cam elements in said other direction, whereby successive actuations of said actuating means alternately engages and disengages said clutch sections.

15. In combination, a shaft, a pair of driving and driven clutch members thereon, one connected non-rotatably with said shaft and the other rotatable relative to said shaft, one of said driving and driven members being slidable into and out of engagement with the other member, a pair of relatively rotatable cam elements disposed to react against said clutch members to effect their engagement and disengagement, there being external ratchet teeth formed on one of said cam elements, a relatively stationary part, a pawl reacting against said relatively stationary part to prevent said one cam element from rotating in one direction, and a control arm on the other cam element, whereby oscillations of said other cam element cause the successive advance of said one cam element.

WILLIAM A. HYLAND.

CERTIFICATE OF CORRECTION.

Patent No. 2,336,099.  December 7, 1943.

WILLIAM A. HYLAND.

It is hereby certified that error appears in the printed specification of the above numbered patent requiring correction as follows: Page 3, first column, line 4, claim 2, for "positions" read --portions--; page 4, second column, line 9, claim 13, after "case" insert --and--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.